United States Patent
Loos et al.

[11] 3,921,388
[45] Nov. 25, 1975

[54] DRAG CHAIN

[75] Inventors: Kurt Loos, Netphen-Dreis-Tiefenbach; Werner Moritz, Siegen, both of Germany

[73] Assignee: Kabelschlepp Gesellschaft mit beschrankter Haftung, Siegen, Germany

[22] Filed: Dec. 4, 1974

[21] Appl. No.: 529,267

[30] Foreign Application Priority Data
Dec. 4, 1973 Germany............................ 2360227

[52] U.S. Cl. .................. 59/78.1; 138/106; 174/69; 191/12 C; 248/51
[51] Int. Cl.² .......................................... F16G 13/16
[58] Field of Search ........... 59/78.1, 78; 248/49, 51, 248/52, 68; 74/250 C; 191/12 C; 174/69, 135; 138/106, 108, 120

[56] References Cited
UNITED STATES PATENTS

| | | | |
|---|---|---|---|
| 3,197,954 | 8/1965 | Merker | 59/78.1 |
| 3,448,953 | 6/1969 | Kurlandsky | 248/51 |
| 3,448,954 | 6/1969 | Kurlandsky | 248/51 |
| 3,503,579 | 3/1970 | Kurlandsky | 248/51 |
| 3,504,864 | 4/1970 | Kurlandsky | 248/51 |
| 3,664,619 | 5/1972 | Heidrich | 248/51 |
| 3,848,407 | 11/1974 | Moritz | 248/49 |

FOREIGN PATENTS OR APPLICATIONS
1,142,150   2/1969   United Kingdom.................. 248/52

*Primary Examiner*—C. W. Lanham
*Assistant Examiner*—Gene P. Crosby
*Attorney, Agent, or Firm*—Walter Becker

[57] ABSTRACT

A drag chain for feeding energy conveying means from a fixed connection to a movable connection, which has a plurality of chain links pivotally connected to each other. Each of the chain links is composed of two oblong link discs what at one end portion abut each other and at the other end portion define with each other a slot for pivotally receiving another chain link. Bolt means are provided for respectively firmly holding together the two link discs making up a link. Furthermore, at each connecting area of one link with the next link, one link is provided with two pairs of oblong recesses engaged by abutment pins of the adjacent link for limiting the angular movement of two adjacent links relative to each other. Inserts are exchangeably and removably arranged in the oblong recesses to vary the free space of the recesses and thereby to vary the pivot angle of the respective adjacent links relative to each other.

9 Claims, 8 Drawing Figures

DRAG CHAIN

The present invention relates to a drag chain for guiding energy conveying means of various types from a fixed connection to a movable consumer, said energy conveying means being arranged in continuous inner spaces of a supporting link chain. The link chain comprises chain links connected to webs or stays, while each chain link is composed of two oval link discs which for purposes of receiving the respective adjacent chain link form at one end therebetween a fork-shaped opening while engaging each other at the other end, and while for limiting the mutual pivot angle, each chain link is in the circumferential direction thereof provided with oval openings which extend around a common pivot pin and which are engaged by abutment pins of the respective other chain link.

A drag chain of the above mentioned type for guiding energy conveying means has become known, according to which the individual link discs of the chain links are punched out of sheet metal are deformed and then after the insertion of intermediate discs are interconnected by rivets. Thereupon the webs or stays have to be screwed on in order to combine two chain links to a combination chain link. Thereupon the connection of the individual chain links to form a link chain is effected by inserting link pins and abutment bolts. This known energy chain has the drawback that the assembly is rather time-consuming and consequently expensive.

A further drawback of this known energy chain consists in that the mutual pivot angle of the individual chain links relative to each other is fixed by the length of the oblong holes arranged in the circumferential direction about the pivot axes and cannot later be changed. This known chain for energy conveying means can for this reason be produced and used always only for a certain purpose of employment. A later adaptation of the radius of curvature for further employment purposes is not possible.

Another drag chain for energy conveying means has become known which can be composed of one-piece elements of synthetic material. Also with this heretofore known drag chain, the mutual pivot angle of the individual chain links is fixed by the spatial position of the abutments. A later adaptation to various radii of curvature for other employment purposes is not possible.

It is, therefore, an object of the present invention to provide a drag chain for energy conveying means which is designed in conformity with the building block system and thus will permit a simple assembly and later adaptation of the radius of curvature for different employment purposes.

It is also an object of the invention to provide a drag chain as set forth in the preceding paragraph which will overcome the drawbacks inherent to previous constructions as set forth above. These and other objects and advantages of the invention will appear more clearly from the following specification in connection with the accompanying drawings, in which.

Starting with the heretofore known drag chains outlined above for energy conveying means, the problem underlying the present invention has been solved by holding the two link discs of a chain link directly together by chain bolts which have a flat cross section with rounded narrow sides and which are insertable into recesses of the link discs which recesses include undercut portions and are cut so as to open toward one side, said closure bolts being adapted to be tightened by turning same. The links of the drag chain according to the present invention are furthermore provided with oblong holes into which inserts are insertable for varying the respective maximum pivot angle.

According to an actual design, the oblong holes may be provided either on the fork-shaped opening on the insides of the link discs or may be formed at the other side into the link discs while the pertaining abutment pins are arranged either on the outside or on the fork-shaped opening on the inner side of the link shaped discs.

In order to be able to improve the frictional connection brought about by the turning of the closure bolts in the recesses of the link discs to form a positive connection, the closure bolts may be provided with latching pins which engage slots provided in the link discs within the region of said recesses.

A further simplification and improvement of the arrangement according to the invention consists in that the closure bolts of one chain link element are connected by traverses with the closure bolts of the other chain link element of one and the same chain link in order together with said traverses to form the supporting elements of the web or stay. The inserts insertable into the oblong holes for varying the mutual pivot angle of the chain links expediently have with the embodiment according to which the oblong holes are provided at that end of the link chain discs which are located opposite the fork-shaped opening, twice the thickness of the wall of a chain link disc so that they will engage the oblong holes of both chain link discs.

In order to be able to fix both chain link discs of a chain link in their respective mutual position, it has proved expedient, in addition to the closure bolts, to press connecting bolts with press fit into abutment pivots formed onto the link discs and into hinge pins, said connecting bolts extending through said abutment pivots and hinge pins.

The link discs, abutment pivots and link pins may in both embodiments consist of one piece of synthetic material produced for instance as injection mold part.

According to a further development of the invention, brackets for guiding a cover band may be slipped onto the traverses which are connected to the closure bolts and form the supporting elements of the web or stay.

Figure 1:
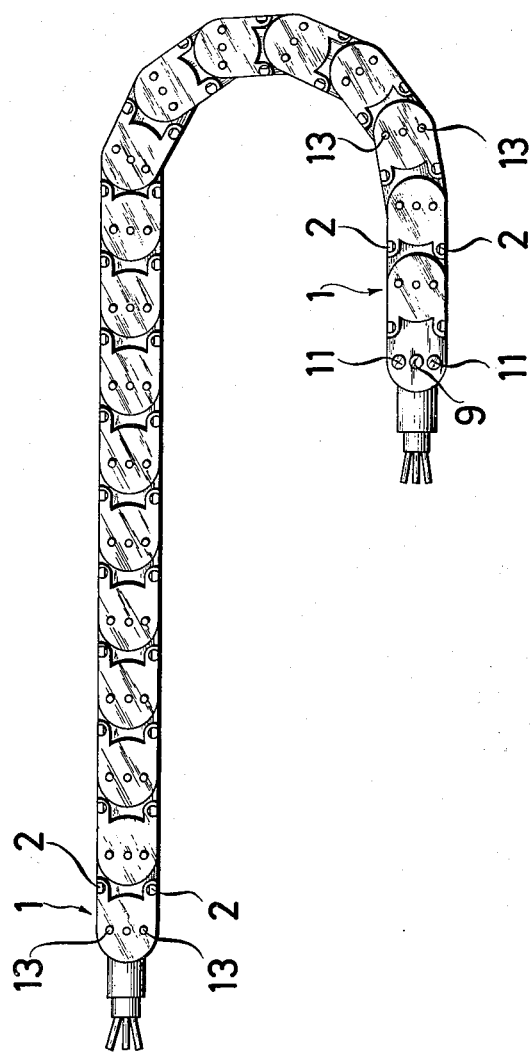
FIG. 1 is a side view of a drag chain according to the invention with energy conveying means inserted therein.
Figure 2:
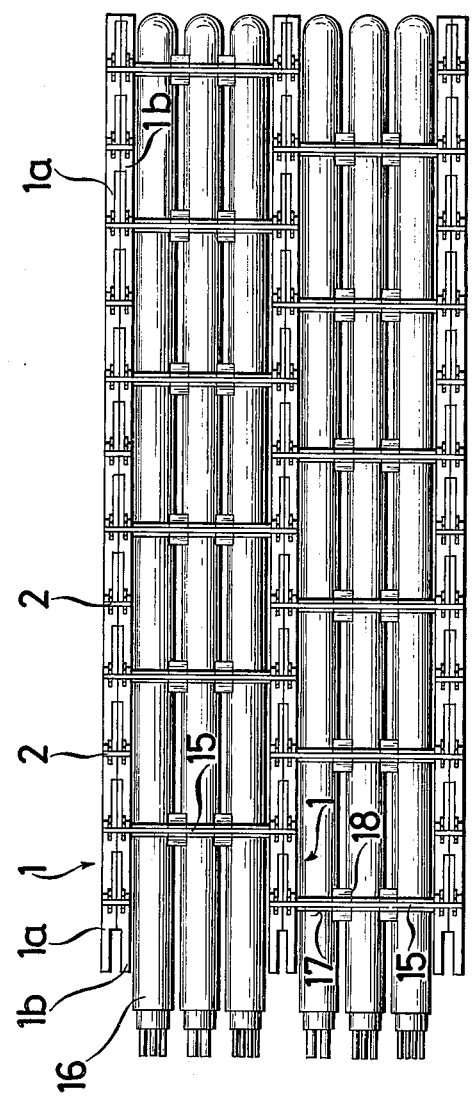
FIG. 2 is a top view of FIG. 1.

Referring now to the drawings in detail, FIGS. 1 and 2 illustrate a composite drag chain for guiding energy conveying means. The drag chain comprises individual chain links 1, each of which is composed of two link elements 1a, 1b designed as an image to each other. The two link discs 1a and 1b of one and the same chain link are held together by a closure bolt 2, latching pins 3 being connected to said closure bolt 2. The closure bolts 2 have a flattened cross section with rounded narrow sides. For purposes of inserting the closure bolt 2, approximately in the center of each link disc 1a, 1b at the top and bottom side thereof there are provided recesses 4 which are cut so as to be open toward the top and bottom side respectively of the disc 1a, 1b and are provided with undercuts. The closure bolt 2 is in upright position inserted into said recesses 4 and is then by means of a tool turned by 90° so that the closure bolt with press fit engages the undercuts of the recesses 4 and frictionally interconnects the two discs 1a, 1b. In order to improve this frictional engagement so as to provide a positive engagement, latching pins 3 are provided which engage slots 5 of the discs 1a, 1b.

The chain links 1 can be connected to form a link chain which is bendable in one direction while in the other direction it is designed straight in the form of a cantilever. To this end, the link discs 1a, 1b are at one end offset toward the outside by their wall thickness so that the chain link discs of one and the same chain link define a fork-shaped opening 6 into which the flat end 7 of another chain link can be inserted. In order to bring about the link connection of two chain links, pivot holes 8 are within the region of the opening 6 provided in the chain link discs 1a, 1b, and hinge pins 9 are formed onto the outside at the flat end 7. For limiting the mutual pivot angle of two interconnected chain links 1, oblong holes 10 are provided within the region of the opening 6 in circumferential direction with regard to the pivot holes 8. Abutment pins 11 are formed onto the flat end 7 on the outside. By the circumferential angle of the oblong holes 10, the maximum mutually possible pivot angle of two interconnected chain links is determined. This maximum pivot angle can later on be varied by inserts 12 in order to be able to adapt the drag chain to various purposes of employments. Inasmuch as the oblong holes are not open toward the outside, the insert 12 cannot drop out of the oblong holes 10.

In order better to fix the two link discs 1a, 1b in addition to the closure bolts 2, relative to each other, connecting bolts 13 are additionally inserted into the two abutment pivots 11.

Figure 3:
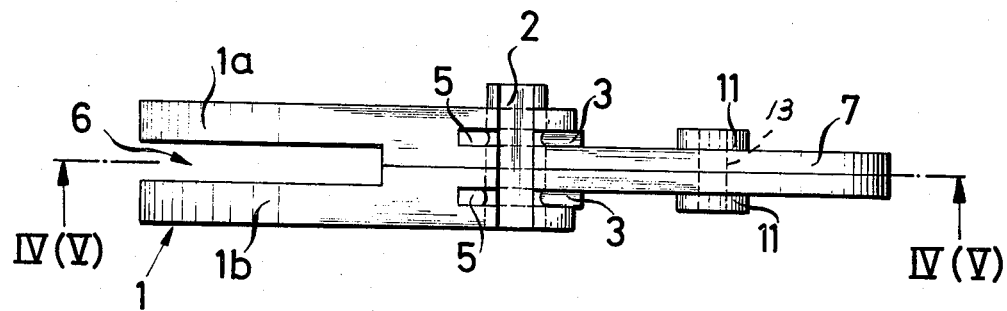
FIG. 3 shows a chain link of a drag chain for energy conveying means, in which the chain link is provided with a fork-shaped end portion and longitudinal slot in said fork-shaped end portion.
Figure 4:
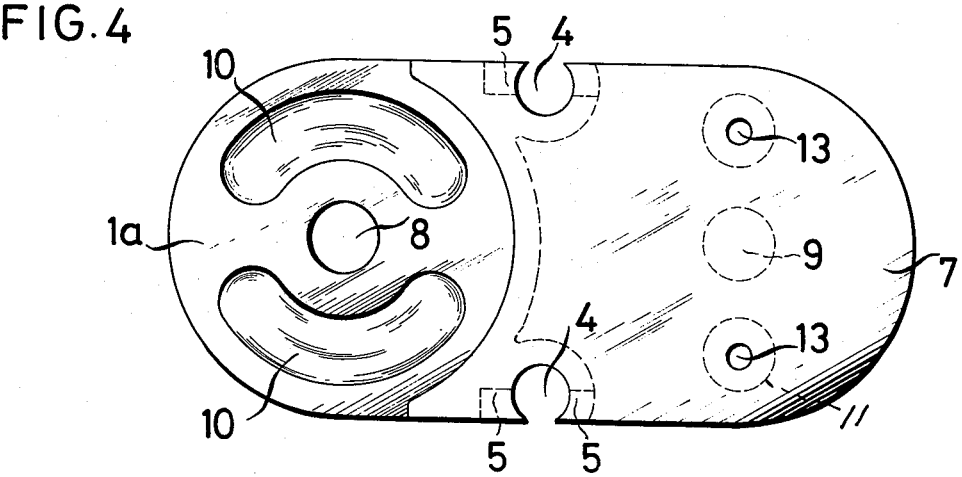
FIG. 4 is a section taken along the line IV—IV of FIG. 3 but without closure bolt and without inserts.
Figure 5:
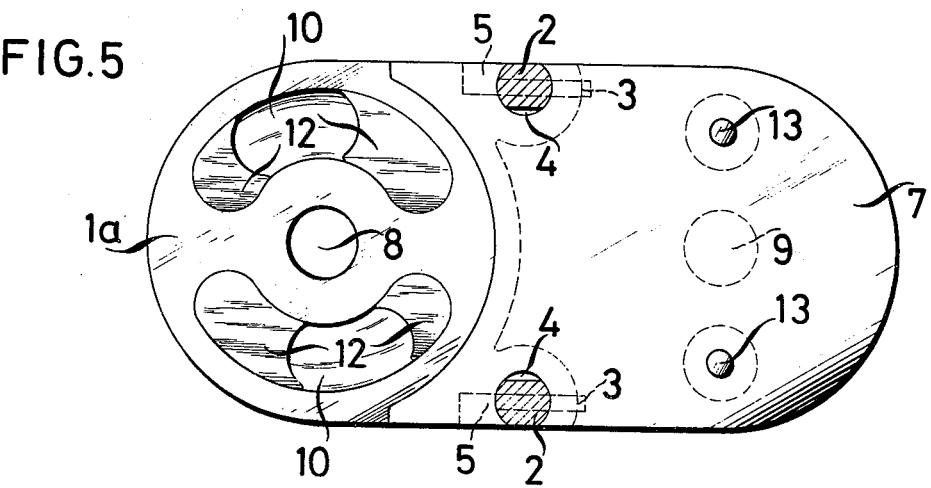
FIG. 5 represents a section taken along the line V—V of FIG. 3 with inserted closure bolt and inserts.
Figure 6:
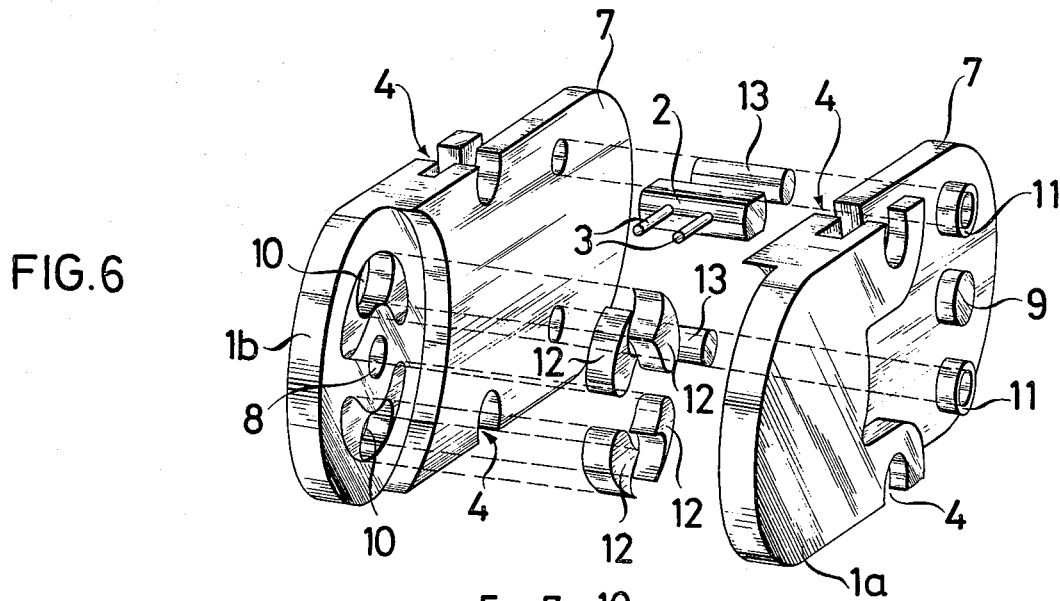
FIG. 6 represents an isometric exploded view of the chain link of FIG. 3.
Figure 7:
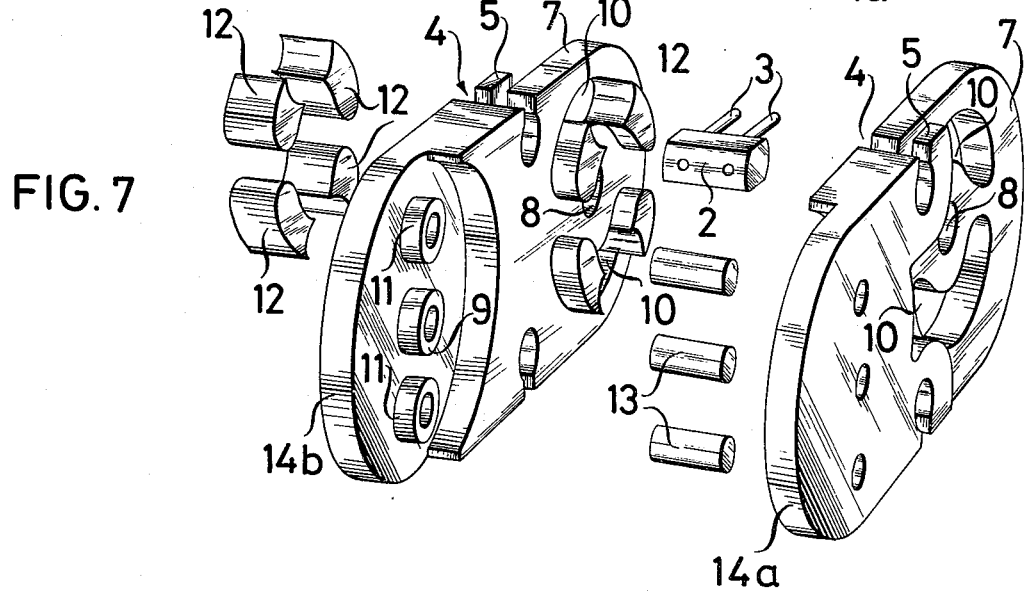
FIG. 7 is a modification of the chain link over FIGS. 1-6 and more specifically illustrates an isometric exploded view of said modification.
Figure 8:
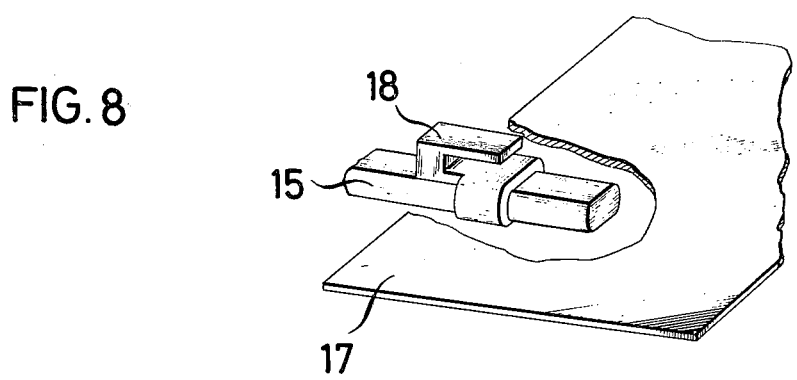
FIG. 8 illustrates an isometric view of a section of a traverse with a mounted bracket for guiding a cover band.

According to the embodiment of FIG. 7, the two link discs 14a, 14b of the chain link 14 are so designed that the oblong holes 10 are arranged at the flat end 7 around pivot holes 8, whereas the link pins 9 and abutment pivots 11 are within the region of the fork-shaped opening 6 formed on the inside of the link discs 14a, 14b. With this embodiment, the inserts 12 have about twice the thickness of a link disc 14a, 14b so that they will simultaneously extend into both link discs. Also with this embodiment, the inserts 12 cannot drop out of the oblong holes 10 because they are held in said holes 10 by the respective adjacent chain link 14. In all other respects, the connection of the two link discs 14a, 14b to each other to form a chain link 14 corresponds to the embodiment illustrated in and described in connection with FIGS. 3–5.

Two link chains made up by the chain links 1,14 may be interconnected by traverses 15 to form a drag chain for guiding energy conveying means. The ends of the traverses 5 are for this purpose designed as closure bolts 2. Between the traverses 15 arranged in one plane and pertaining to one chain link, energy conveying means 16 for instance in the form of hoses or cables may be arranged. FIG. 2 shows a multi-band chain which is composed of three link chains arranged parallel to each other and in which the three chains are interconnected by traverses 15. The traverses 15 are offset relative to each other and are inserted into each second chain link 1. From this illustration it will be evident that the drag chain according to the invention is variable not only with regard to its radius of curvature but can also in the form of a multi-band chain be made practically of any width.

The energy conveying means 16 which are exposed toward the top and toward the bottom may be covered up by a cover band 7 which is inserted below hooks 18 adapted to be clamped onto the traverses 15.

As will be evident from the above, the drag chain according to the invention has the outstanding technical advantages that it is composed of only a minimum of individual parts which can easily and quickly be assembled, and that a later adaptation of the relative pivot angle of the individual chain links is possible by the arrangement of inserts of different sizes into the oblong holes. A further technical advantage consists in that the link discs of the chain links can due to their design easily be made as injection molded articles of synthetic material.

It is, of course, to be understood that the present invention is, by no means, limited to the specific showing in the drawings but also comprises any modifications within the scope of the appended claims.

What we claim is:

1. A drag chain for feeding energy conveying means from a fixed connection to a movable consumer, which includes: a plurality of chain links pivotally connected to each other, each of said chain links comprising two link discs abutting each other along a first end portion and spaced from each other at the oppositely located second end portion so as to define a slot open in the direction away from said first end portion for receiving a first end portion of another chain link, one of said end portions of each chain link being provided with transverse axially aligned pivot means and with two abutment pin means respectively arranged on diametrically opposite sides of said pivot means in equally spaced relationship thereto, the other one of said end portions being provided with axially aligned bores for receiving the axially aligned pivot means of another chain link, said last mentioned end portion of said link also being provided with two pairs of oblong recesses respectively associated with the two link discs pertaining to said link, insert means exchangeably insertable into said two pairs of recesses for varying the free space in said oblong recesses, the abutment pin means of said other chain link movably engaging the other free space of said oblong recesses of the chain link cooperating with said other chain link, each of said link discs of one and the same chain link having oppositely located longitudinal edges with undercut cutouts respectively cut open toward the respective adjacent disc edge along a chord formed by an extension of the respective adjacent edge of the respective chain link, and connecting bolt means having a flattened cross section with oppositely located rounded narrow sides and transverse thereto with oppositely located flat sides, said connecting bolts being insertable into the respective undercut cutouts and being operable by turning about the longitudinal axis thereof to be clamped in said cutouts.

2. A drag chain according to claim 1, in which said connecting bolt means include locking pin means, and in which at least one of each two link discs forming a link is provided with slot means for receiving said locking pin means to assure a positive interlock between said link discs.

3. A drag chain according to claim 1, in which said insert means are at least approximately twice as thick as the wall thickness of adjacent wall portions of two link discs pertaining to one and the same link.

4. A drag chain according to claim 1, which includes interconnecting pins respectively inserted into said abutment pin means and said pivot means.

5. A drag chain according to claim 1, in which said link discs and their abutment pin means and their pivot means form one single integral piece of synthetic material.

6. A drag chain according to claim 1, which includes traverse means connecting the connecting bolt means engaging one of said link disc means with the connecting bolt means engaging the other.

7. A drag chain according to claim 6, which includes hook means mounted on said traverse means for receiving and securing cover means for said drag chain.

8. A drag chain for feeding energy conveying means from a fixed connection to a movable consumer, which includes: a plurality of chain links pivotally connected to each other, each of said chain links comprising two link discs abutting each other along a first end portion and spaced from each other at the oppositely located second end portion so as to define a slot open in the direction away from said first end portion for receiving a first end portion of another chain link, the outside surface of each two disc portions pertaining to each other and forming the first end portion of one and the same link being provided with transverse axially aligned pivot means and with two abutment pin means respectively arranged on diametrically opposite sides of said pivot means in equally spaced relationship thereto, each of the two slot defining link disc portions of one and the same chain link which form said end portion thereof having their inside surfaces provided with axially aligned bores for receiving the axially aligned pivot means of another chain link, each of the two slot defining link disc portions of one and the same chain link having their inside surfaces provided with two oblong recesses around and in spaced relationship to said axially aligned bores, insert means exchangeably insertable into said recesses for varying the free space in said oblong recesses, the abutment pin means of said other chain link movably engaging the free space of said oblong recesses of the chain link for operating with said other chain link, each of said link discs of one and the same chain link having oppositely located longitudinal edges with undercut cutouts respectively cut open toward the respective adjacent disc edge along a chord formed by an extension of the respective adjacent edge of the respective chain link, and connecting bolt means having a flattened cross section with oppositely located rounded narrow sides and transverse thereto with oppositely located flat sides, said connecting bolts being insertable into the respective undercut cutouts and being operable by turning about the longitudinal axis thereof to be clamped in said cutouts.

9. A drag chain for feeding energy conveying means from a fixed connection to a movable consumer, which includes: a plurality of chain links pivotally connected to each other, each of said chain links comprising two link discs abutting each other along a first end portion and spaced from each other at the oppositely located second end portion so as to define a slot open in the direction away from said first end portion for receiving a first end portion of another chain link, the inside surface of each two disc portions pertaining to each other and forming said second end portion of one and the same link being provided with transverse axially aligned pivot means and with two abutment pin means respectively arranged on diametrically opposite sides of said pin means in equally spaced relationship thereto, each of the two link disc portions of one and the same chain link which form said first end portion thereof being provided with axially aligned bores for receiving the axially aligned pivot means of another chain link, each of the two link disc portions pertaining to one and the same chain link and forming said first end portion of said chain link respectively being provided with two pairs of oblong recesses around and in spaced relationship to said axially aligned bores, insert means exchangeably insertable into said recesses for varying the free space in said oblong recesses, the abutment pin means of said other chain link movably engaging the free space of said oblong recesses of the chain link cooperating with said other chain link, each of said link discs of one and the same chain link having oppositely located longitudinal edges with undercut cutouts respectively cut open toward the respective adjacent disc edge along a chord formed by an extension of the respective adjacent edge of the respective chain link, and connecting bolt means having a flattened cross section with oppositely located rounded narrow sides and transverse thereto with oppositely located flat sides, said connecting bolts being insertable into the respective undercut cutouts and being operable by turning about the longitudinal axis thereof to be clamped in said cutouts.

* * * * *